United States Patent
Hartvigsen et al.

(10) Patent No.: US 6,183,897 B1
(45) Date of Patent: Feb. 6, 2001

(54) VIA FILLED INTERCONNECT FOR SOLID OXIDE FUEL CELLS

(75) Inventors: Joseph Jay Hartvigsen, Kaysville; Ashok Chandrashckhar Khandkar, Salt Lake city; Singaravelu Elangovan, Sandy, all of UT (US)

(73) Assignee: Sofco, New Orleans, LA (US)

( * ) Notice: Under 35 U.S.C. 154(b), the term of this patent shall be extended for 0 days.

(21) Appl. No.: 09/153,959

(22) Filed: Sep. 16, 1998

(51) Int. Cl.$^7$ ............................................ H01M 8/12
(52) U.S. Cl. ............................ 429/32; 429/33; 264/214
(58) Field of Search ............................ 429/30, 32, 33; 264/214, 219

(56) References Cited

U.S. PATENT DOCUMENTS

| | | | |
|---|---|---|---|
| 3,717,506 | * 2/1973 | Hopkins | 429/32 |
| 4,510,212 | * 4/1985 | Fraioli | 429/30 |
| 4,666,798 | * 5/1987 | Herceg | 429/30 |
| 5,063,122 | * 11/1991 | Rohr | 429/32 |
| 5,273,837 | * 12/1993 | Aitken et al. | 429/30 |
| 5,501,914 | * 3/1996 | Satake et al. | 429/30 X |
| 5,614,127 | * 3/1997 | Khandkar et al. | 429/3.3 X |
| 5,789,093 | * 8/1998 | Malhi | 429/34 |
| 5,827,620 | 10/1998 | Kendall | 429/31 |

FOREIGN PATENT DOCUMENTS

WO 94/22178   9/1994   (WO).

* cited by examiner

*Primary Examiner*—Stephen Kalafut
(74) *Attorney, Agent, or Firm*—Factor & Partners

(57) ABSTRACT

An interconnect for a solid oxide fuel cell comprises a gas separator plate and at least one fill material. The gas separator plate includes at least one via extending therethrough. The at least one fill material is positioned within the at least one via, and operatively associated with at least one of a cathode or anode. The invention likewise includes a method for manufacturing the interconnect for a solid oxide fuel cell.

14 Claims, 3 Drawing Sheets

VIA FILLED INTERCONNECT FOR SOLID OXIDE FUEL CELLS

BACKGROUND OF THE INVENTION

1. Field of the Invention

The present invention relates generally to the field of power generation and in particular to an improved interconnect for a solid oxide fuel cell.

2. Background of the Invention

Global demand for power generation in the next twenty years is expected to increase by about 2 million MW, of which 490,000 MW are projected to be powered by natural gas. Utility deregulation in the United States, concerns over health issues and capital costs associated with the transmission and distribution of electrical power make it likely that at least 30% of this natural gas fired capacity will be provided by modular power plants located in close proximity to the end users.

Solid oxide fuel cells are an attractive solution for meeting those needs for distributed power in a manner which is both energy efficient and environmentally sound. Solid oxide fuel cells offer modularity as well as higher fuel efficiency, lower emissions, and less noise and vibration than gas turbines or diesel generators. Data from test modules show that $No_x$ production is greatly reduced and almost non-existent in fuel cells. At the same time, fuel cell test modules have been tested to operate at greater than 50% efficiency.

In order to be widely accepted by delivering energy efficiently and in an environmentally sound manner, solid oxide fuel cells must be able to cost-effectively produce electricity and heat. The capital and operating costs of solid oxide fuel cells must compare favorably with alternative sources for distributed power, such as internal combustion engines and gas turbines.

Interconnect functionality and cost are two of the biggest barriers to producing market competitive solid oxide fuel cell generators. The interconnect must provide reactant gas separation and containment, mechanical support to the cells and a low resistance path for current connecting the cells electrically in series and/or in parallel. Meeting these functional requirements remains a challenge. Monolithic interconnects made of lanthanum chromite and high chromium alloys have been used with some success. However, both types are quite expensive and compromise aspects of the interconnect function.

Lanthanum chromite and high chromium alloys are currently cost prohibitive for use in commercial products with a conventional monolithic interconnect design. Projected costs, assuming high production volumes using net shape ceramic processing or a metal forming process, are potentially low enough to enable marginally cost competitive solid oxide fuel cell power generation. However, the gap between required startup cost and initial market size is a decisive barrier to solid oxide fuel cell commercialization.

Gas separation requires a dense impermeable material which does not have significant ionic conductivity. Alloy interconnects that have been developed readily satisfy this requirement. Ceramic processing has developed the capability to produce interconnects of sufficiently high density, however, many compositions have unacceptably high ionic conductivity. The known compositions of such ceramics possessing low ionic conductivity also have less than acceptable electronic conductivity or are not well matched to the coefficient of thermal expansion (CTE) of the cell.

Matching cell and interconnect coefficients of thermal expansion allows sealing of cells to interconnects for gas containment. Alloy interconnects generally have a higher CTE than the CTE of the cell. While the CTE of ceramic interconnects are more nearly matched than alloy interconnects, they are still lower than that of the cell. As a result, regions of the cell may be adversely displaced wherein it becomes difficult to effectively confine reactant gases to their intended flow paths, which in turn adversely affects the stack efficiency. While changes between room and operating temperatures produce the largest thermal displacements, temperature changes in a stack as reactant and current flows are varied can also create undesirable detrimental displacements.

Dissimilar thermal expansion characteristics also cause the relative motion imparted by thermal expansion to disrupt the electrical current path between the electrodes and interconnects. The contact resistance generated in this way significantly reduces stack performance and efficiency. In the case of alloy interconnects, the motion can dislodge a protective oxide scale and expose underlying unprotected material. Oxidation of the unprotected material increases the overall scale thickness, and as scale conductivity is comparatively poor, scale growth contributes directly to performance degradation.

The issues presented by oxide scale conductivity and growth are some of the most challenging of all those confronting developers of metal interconnects. Scale resistance is a function of oxide conductivity, thickness and continuity. Porous or laminar scales have the effect of increasing the current path length while reducing the effective current carrying cross sectional area. The mechanism for scale conductivity and growth are related such that scale growth rate increases with scale conductivity. Higher growth rates generally produce less dense, less adherent scales. Any alloy (other than noble or semi-noble metals) will have to compromise scale conductivity in order to control degradation due to scale growth. Coating the interconnect with a conductive oxide layer provides more control of the scale composition and microstructure but does not change the basic nature of the problem.

Thus, it is an object of the present invention to provide an interconnect for a solid oxide fuel cell which permits substantial matching of cell and interconnect coefficients of thermal expansion.

It is a further object of the invention to provide an interconnect region manufactured using vias to fill the interconnect space between the cell anode and cathode to match the material coefficients of thermal expansion.

It is also an object of the invention to separate the interconnect functions of gas separation and containment, from the current carrying function of the interconnect, thereby enabling selection of materials best suited to each function and atmosphere.

SUMMARY OF THE INVENTION

The present invention comprises an interconnect for a solid oxide fuel cell comprising a gas separator plate and at least one fill material. The gas separator plate includes at least one via extending therethrough. The at least one fill material is positioned within the at least one via and is operatively associated with at least one of a cathode or an anode.

In a preferred embodiment, the interconnect includes at least an anode contact associated with the anode, and a cathode contact associated with the cathode. In either case, the contacts have coefficients of thermal expansion which are the same or substantially similar to the coefficient of thermal expansion of the associated fill material.

In another preferred embodiment, the at least one fill material comprises two fill materials, specifically, an anode fill material and a cathode fill material. The anode fill material is associated with the anode and the cathode fill material is associated with the cathode.

In yet another preferred embodiment, the at least one fill material includes at least one coefficient of thermal expansion. In such an embodiment, the interconnect may further comprise at least one anode contact that is associated with the anode, and at least one cathode contact that is associated with the cathode. The coefficient of thermal expansion of the at least one fill material is the same or substantially similar to that of at least one of the anode contact or the cathode contact. In this preferred embodiment, the fill material is directly associated with the respective anode and/or cathode contact. Accordingly, the coefficient of thermal expansion of the fill material will substantially match that of the associated anode and/or cathode contact.

In a preferred embodiment, the anode fill material is one of silver-palladium and a mixture of a high chromium alloy (such as is commercially manufactured by PLANSEE, A.G. of Austria, and wherein such a mixture is hereinafter identified as "PLANSEE") via a powder metal process and doped lanthanum chromite (hereinafter identified as "LSMC") and the gas separator plate may comprise a yttria stabilized zirconia (3YSZ). The cathode fill material may comprise one of lanthanum strontium manganite and a mixture of LSMC and lanthanum cobaltite (hereinafter identified as "LSCo").

In such a preferred embodiment, the anode contact may comprise one of nickel, PLANSEE and LSMC, and the cathode contact may comprise one of silver-palladium, lanthanum strontium manganite and LSCo.

The invention further includes a method for manufacturing an interconnect for a solid oxide fuel cell. The method comprises the steps of: (a) providing a gas separator plate; (b) forming at least one via through the gas separator plate; (c) introducing at least one fill material into the at least one via; and (d) operatively associating at least one of a cathode or anode with the at least one fill material.

In a preferred embodiment, the method further comprises the step of: (a) associating at least one of an anode contact and/or a cathode contact with one end of the at least one via. The coefficient of thermal expansion thereof is the same or substantially similar to the thermal expansion of the at least one fill material. Of course, it is likewise contemplated that both the anode contact and cathode contact can be operatively associated with corresponding portions of the fill material, and that the respective coefficients of thermal expansion are the same or substantially similar In another preferred embodiment, the step of introducing the at least one fill material comprises the steps of: (a) placing a metal ink into the at least one via; and (b) sintering the metal ink to density.

DETAILED DESCRIPTION OF THE PREFERRED EMBODIMENTS

Figure 1:
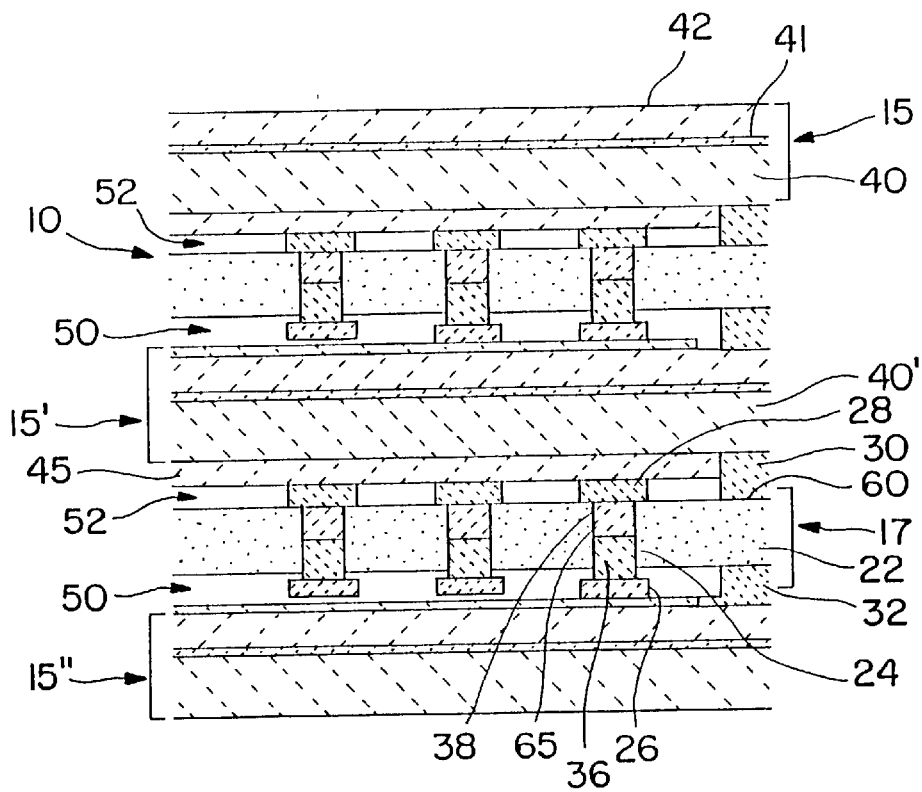
FIG. 1 is a side elevational view of a section of a solid oxide fuel cell stack having an interconnect according to the invention.

While this invention is susceptible of embodiment in many different forms, there is shown in the drawings and will herein be described in detail, one specific embodiment, with the understanding that the present disclosure is to be considered as an exemplification of the principles of the invention and is not intended to limit the invention to the embodiment illustrated.

A portion of solid oxide fuel cell stack 10 is shown in FIG. 1 as comprising a monolithic structure that includes a plurality of trilayer cells, such as trilayer cell 15 and a via-filled interconnect such as via-filled interconnect 17 positioned between any two trilayer cells. While the embodiment of FIG. 1 is shown as comprising a stack having three trilayer cells and two interconnects, it is likewise contemplated that, depending on the requirements for the particular application, a particular cell may comprise any number of trilayer cells (and corresponding interconnects) having any one of a number of varying shapes and sizes.

As shown in FIG. 1, each trilayer cell, such as trilayer cell 15, includes anode 40, electrolyte 41 and cathode 42. As will be understood, the anode, the electrolyte and the cathode may comprise a variety of combinations of materials which are well known in the art.

Figure 2:
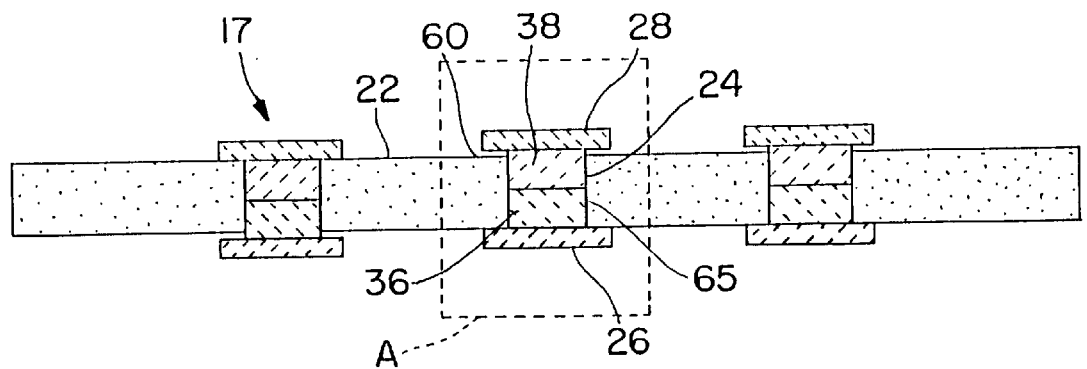
FIG. 2 is a side elevational view of a interconnect of the stack of FIG. 1.
Figure 3:
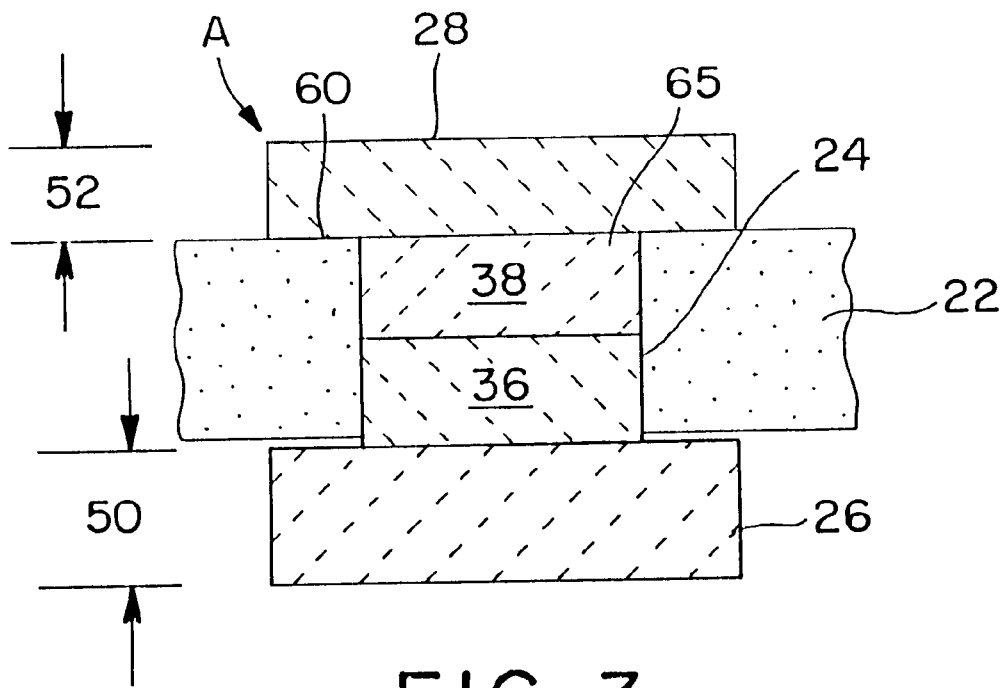
FIG. 3 is an enlarged view of the region A shown in FIG. 2.

As shown in FIGS. 1 and 2, each via-filled interconnect, such as via-filled interconnect 17 (FIG. 2) comprises gas separator plate 22, fill material 24, cathode contact 26, anode contact 28 and seals 30, 32 (FIG. 1). Gas separator plate 22, as shown in FIGS. 1–3, comprises a ceramic material which includes a plurality of vias, such as via 60. Gas separator plate may comprise a single or multi-layer ceramic substrate. Moreover, many different ceramic compositions may be utilized for the gas separator plate, so long as they are gas impermeable, have minimal ionic conductivity and can withstand the operating temperatures of the fuel cell, as will be understood by one of skill in the art. For example, and while not limited thereto, the interconnect may comprise a yttria stabilized zirconia, such as 3 mole percent $Y_2O_3$ (3YSO).

Figure 4:
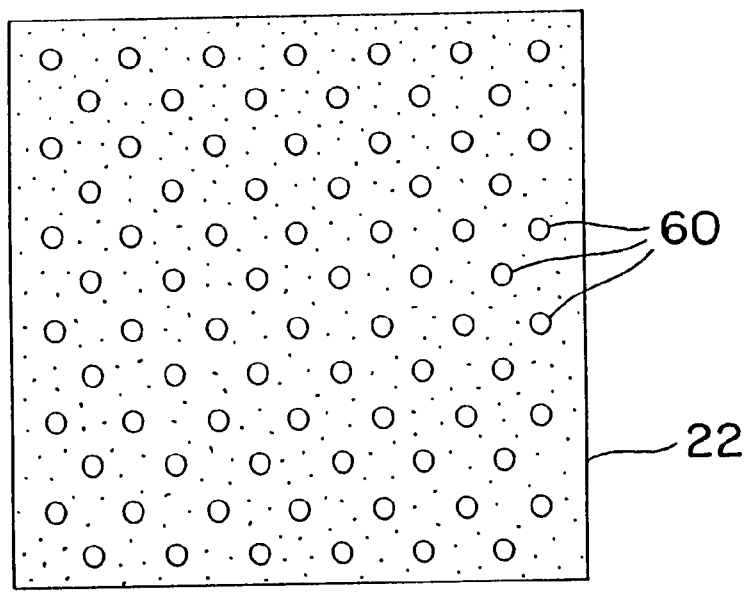
FIG. 4 is a top plan view of the interconnect used in the cell stack of FIG. 1.

Vias, such as via 60, are shown in FIGS. 2–4 as comprising openings that extend through the one or more layers that comprise the gas separator plate 22. Various dimensions and shapes of the via are contemplated, as well as both uniform and non-uniform crosssectional configurations.

As shown in FIG. 3, fill material 24 includes cathode via fill 36 and anode via fill 38, both of which are positioned within each of vias 60. The cathode via fill and the anode via fill 38 connect at interface 65, to, in turn, provide an electrical connection through the interconnect.

While other configurations are contemplated, the anode fill material has a coefficient of thermal expansion closely matched with the anode contact. Similarly, the cathode fill material has a coefficient of thermal expansion closely matched with the cathode contact. Thus, as the cell operates and thermally expands/contracts, the cell will be free from undesirable distortion. The particular materials utilized for the cathode and the anode fill material will vary and will generally depend on the cathode/anode material that is utilized. For example, cathode via fill 36 may comprise lanthanum strontium manganite, a mixture of PLANSEE and LSMC or a mixture of lSMC and LSCo. Anode via fill 38 may comprise nickel, silver-palladium alloy or a mixture of PLANSEE and LSMC or a mixture of PLANSEE and LSMC. In addition, in certain situations, it is contemplated that both the cathode fill material and the anode fill material may comprise an identical composition, in which case the vias are filled with a single material composition, such as doped chromite, silver-palladium or PLANSEE.

As shown in FIG. 1–3, cathode via fill 36 is electrically connected with cathode contact 26. In particular, as shown in FIG. 1, the cathode contact, through a cathode bond layer 47, is, in turn, bonded to cathode 42" of trilayer cell 15". Similarly, anode via fill 38 is electrically connected with the anode contact 28. The anode contact, through anode bond layer 45, is, in turn bonded to anode 40' of another one of the trilayer cells, such as trilayer cell 15'. While various materials for each of the cathode contact and the anode contact are contemplated, the anode contact may comprise nickel, PLANSEE, silver-palladium or LSMC and the cathode contact may comprise silver palladium, lanthanum strontium manganite, LSM or LSCo.

As also shown in FIG. 1, the relative positioning of the anode contacts between the anode and the gas separator plate defines passageway 52 which facilitates the passage of fuel therethrough. Similarly, the relative positioning of the cathode contacts between the cathode and the gas separator plate defines passageway 50 which facilitates the passage of air therethrough. Seal 30 and seal 32 prevent the air and the fuel, respectively, from undesirably exiting from the respective air and fuel passages. While other materials are contemplated, the seals may comprise a material substantially similar to that of gas separator plate 22.

Figure 5:
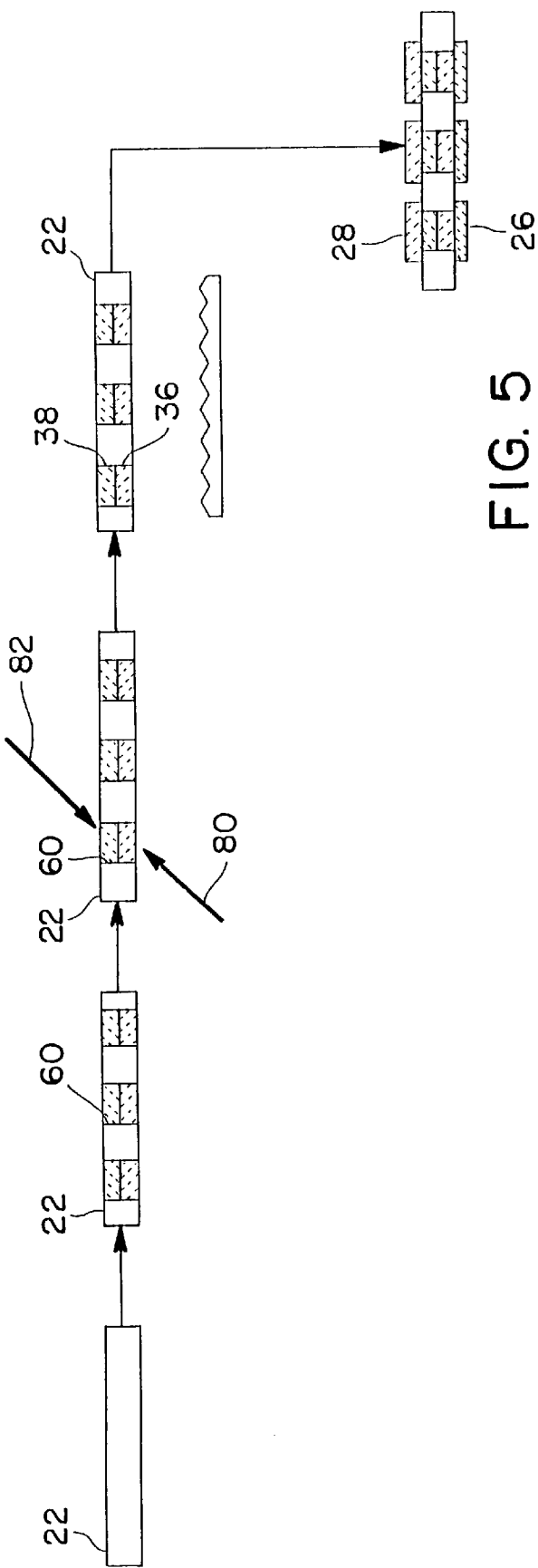
FIG. 5. is a schematic of the method of manufacturing the interconnect.

The manufacture of the cell comprises the assembly of the desired quantity of trilayer cells with the required interconnects. As shown schematically in FIG. 5, the interconnects are manufactured by first selecting the contemplated material for gas separator plate 22. Once separator plate 22 is formed, vias 60 are formed therethrough. One particular pattern for the vias 60 is shown in FIG. 4. Of course, various other patterns for the positioning and orientation of vias that extend through separator plate 22 are likewise contemplated.

Once the vias are formed through separator plate 22, cathode via fill 36 and anode via fill material 38 are each selected. As explained above, the materials are selected based upon their relative coefficients of thermal expansion and the coefficient of thermal expansion of the respective anode or cathode material (or anode contact and cathode contact material). Once selected, the anode via fill and the cathode via fill are introduced into each via. While other processes are contemplated, one maimer in which to introduce the fill into each via comprises the filling of the via with a desired cathode metal ink 80 and a desired anode metal ink 82 and subsequently sintering the material to density. Where the anode via fill and the cathode via fill comprise identical materials, a single material is introduced into the entire via. Once the vias have been filled with the appropriate fill material, anode contact 28 and cathode contact 26, respectively, are connected to complete the assembly of the interconnect. Lastly, the interconnects, the seals and the trilayer cells are assembled in a monolithic construction so as to render completed stacked cell 10, as shown in FIG. 1.

In operation, as the cell thermally expands or contracts through temperature changes due to the operation of the cell and due to external influences on the cell, the via fill material likewise expands or contracts at a rate which is substantially identical to the respective anode or cathode (or anode contact or cathode contact). Thus, throughout the expansion or contraction the fill material and the anode/cathode/contacts can expand or contract at a similar rate. This serves to maintain the integrity of the cell, and prevents distortion which lessens the efficiency of the cell. In addition, the use of both the desired via fill material and the desired gas separator plate material allows the cell to advantageously utilize the benefits of each of the materials.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An interconnect for a solid oxide fuel cell comprising:
   a gas separator plate having at least one via extending therethrough; and
   at least one fill material positioned within the at least one via, and being operatively associated with at least one of a cathode or anode, wherein the at least one fill material comprises two fill materials, an anode fill material associated with the anode and a cathode fill material associated with the cathode.

2. The interconnect according to claim 1 wherein the at least one anode contact is constructed from the group consisting of nickel, chromium alloys, silver-palladium and LSMC.

3. The interconnect according to claim 1 wherein the cathode contact is constructed from the group consisting of silver-palladium, lanthanum strontium manganite and LSCO.

4. The interconnect according to claim 1 wherein the gas separator plate comprises a stabilized zirconia.

5. An interconnect for a solid oxide fuel cell comprising:
   a gas separator plate;
   at least one anode contact positioned on one side of the gas separator plate, the at least one anode contact having a coefficient of thermal expansion;
   at least one cathode contact correspondingly positioned on the other side of the gas separator plate, the at least one cathode having a coefficient of thermal expansion;
   at least one via extending through the gas separator plate between each of the corresponding anode/cathode contact pairs;
   an anode fill material positioned within the at least one via and adjacent the at least one anode contact, the anode fill material having a coefficient of thermal expansion;
   a cathode fill material positioned within the at least one via and adjacent the at least one cathode contact, the cathode fill material having a coefficient of thermal expansion;
   wherein the coefficients of thermal expansion of at least one of the anode contact and the anode fill material, and, the cathode contact and the cathode fill material substantially correspond to each other.

6. The interconnect according to claim 5 further comprising:
   a plurality of anode contacts positioned on one side of the gas separator plate;
   a plurality of cathode contacts correspondingly positioned on the other side of the gas separator plate; and a plurality of vias through the gas separator plate between each of the corresponding anode/cathode contact pairs.

7. The interconnect according to claim 5 wherein the anode fill material includes a coefficient of thermal expansion which substantially corresponds to the coefficient of thermal expansion of the at least one anode contact.

8. The interconnect according to claim 5 wherein the cathode fill material includes a coefficient of thermal expansion which substantially corresponds to the coefficient of thermal expansion of the at least one cathode contact.

9. The interconnect according to claim 8 wherein the anode fill material includes a coefficient of thermal expansion which substantially corresponds to the coefficient of thermal expansion of the at least one anode contact.

10. The interconnect according to claim 5 wherein the anode fill material is selected from the group consisting of silver-palladium, nickel and a mixture of chromium alloys and LSMC.

11. The interconnect according to claim 5 wherein the cathode fill material is selected from the group consisting of lanthanum strontium manganite, chromium alloys and a mixture of LSMC and LSCO.

12. The interconnect according to claim 11 wherein the gas separator plate comprises a stabilized zirconia.

13. A method for manufacturing an interconnect for a solid oxide fuel cell comprising the steps of:

providing a gas separator plate;

forming at least one via through the gas separator plate;

introducing a cathode fill material into the at least one via proximate the cathode contact, the cathode fill material having a coefficient of thermal expansion; and introducing an anode fill material into the at least one via proximate the anode contact, the anode fill material having a coefficient of thermal expansion; and associating at least one anode contact having a coefficient of thermal expansion to one end of the at least one via, and associating at least one cathode contact having a coefficient of thermal expansion to the other end of the at least one vial wherein the coefficient of thermal expansion of the anode fill material substantially corresponding to the coefficient of thermal expansion of the at least one anode contact and the coefficient of thermal expansion of the cathode fill material substantially corresponding to the coefficient of thermal expansion of the at least one cathode contact.

14. A method for manufacturing an interconnect for a solid oxide fuel cell comprising the steps of:

providing a gas separator plate;

forming at least one via through the gas separator plate;

introducing at least one fill material into the at least one via comprising the steps of:

placing at least one of a metal ink and a ceramic ink into the at least one via; and sintering the at least one metal or ceramic ink; and operatively associating at least one of a cathode or anode with the at least one fill material.

* * * * *